UNITED STATES PATENT OFFICE.

AUGUST GERSTNER, OF NEW YORK, N. Y.

SOLUTION FOR USE IN ART OF ELECTROTYPING.

No. 838,977.　　　　Specification of Letters Patent.　　　Patented Dec. 18, 1906.

Application filed April 20, 1906. Serial No. 312,905.

*To all whom it may concern:*

Be it known that I, AUGUST GERSTNER, a citizen of the United States, and a resident of the borough of Brooklyn, in the city and State of New York, have invented a new and useful Solution for Use in the Art of Electrotyping, of which the following is a specification.

My invention relates to a solution for use in the art of electrotyping, and has for its object to provide a great saving in the number of steps required to produce the electrotype-plate, thus materially cheapening the process and saving a considerable amount of time in carrying out the same.

My invention consists in a solution of nitrate of silver, chlorid of sodium, and graphite, which is applied to a mold for forming on the mold a thin coating of chlorid of silver, which will combine with the copper in the electroplating-bath to form a metallic silver coating, the application of the solution above mentioned being intended as a substitute for a number of the steps now commonly employed in the art of making electrotype-plates.

It has heretofore been usual in the making of electrotype-plates to submit the wax mold after it has been built up to the leading process, then polishing the mold, then submitting the mold to the action of a blower for blowing out the superfluous particles of graphite, then submitting the mold to a washing process, then submitting the mold to a treatment consisting in dipping the mold in a bath of sulfate of copper, sprinkling iron filings on the mold, and subsequently washing the face of the mold with sulfate of copper. All these steps have been usually taken before the mold is stopped off or trimmed and submitted to the action of the battery for electroplating the same.

In my invention the only step which is performed after the graphite has been blown out subsequent to the building-up step is to apply to the mold a solution composed of nitrate of silver, chlorid of sodium, and graphite and subsequently submitting the mold to the electroplating-bath.

The proportions of the several ingredients of the solution which I have found to be very successful in so treating the mold as to permit a very rapid deposit of copper thereon in the electroplating bath are as follows: nitrate of silver, one ounce; chlorid of sodium, two ounces; graphite, (molding-lead,) two pounds, and water, one gallon.

This solution may be applied by using a sprinkling-hose attached to a rotary pump connected with a tank containing the solution, so that the mold may be held over the tank and the solution permitted to drop back into the tank after the mold has been treated, thus permitting the solution to be used over and over.

I have found that by applying the solution as above described to the mold the mold when dipped in the electroplating-bath will become rapidly plated.

What I claim is—

1. A solution for use in the art of electrotyping comprising nitrate of silver, chlorid of sodium and graphite.

2. A solution for use in the art of electrotyping comprising nitrate of silver, nitric acid, chlorid of sodium and graphite in substantially the following proportions: nitrate of silver, one ounce; chlorid of sodium, two ounces; graphite, two pounds, and water, one gallon.

In testimony that I claim the foregoing as my invention I have signed my name, in presence of two witnesses, this 19th day of April, 1906.

AUGUST GERSTNER.

Witnesses:
　FREDK. HAYNES,
　HENRY THIEME.